March 7, 1939.  I. H. JEWELL  2,149,680
FILTER
Filed Feb. 28, 1935  8 Sheets-Sheet 1

Inventor
Ira H. Jewell.
By John Howard McElroy
his Atty.

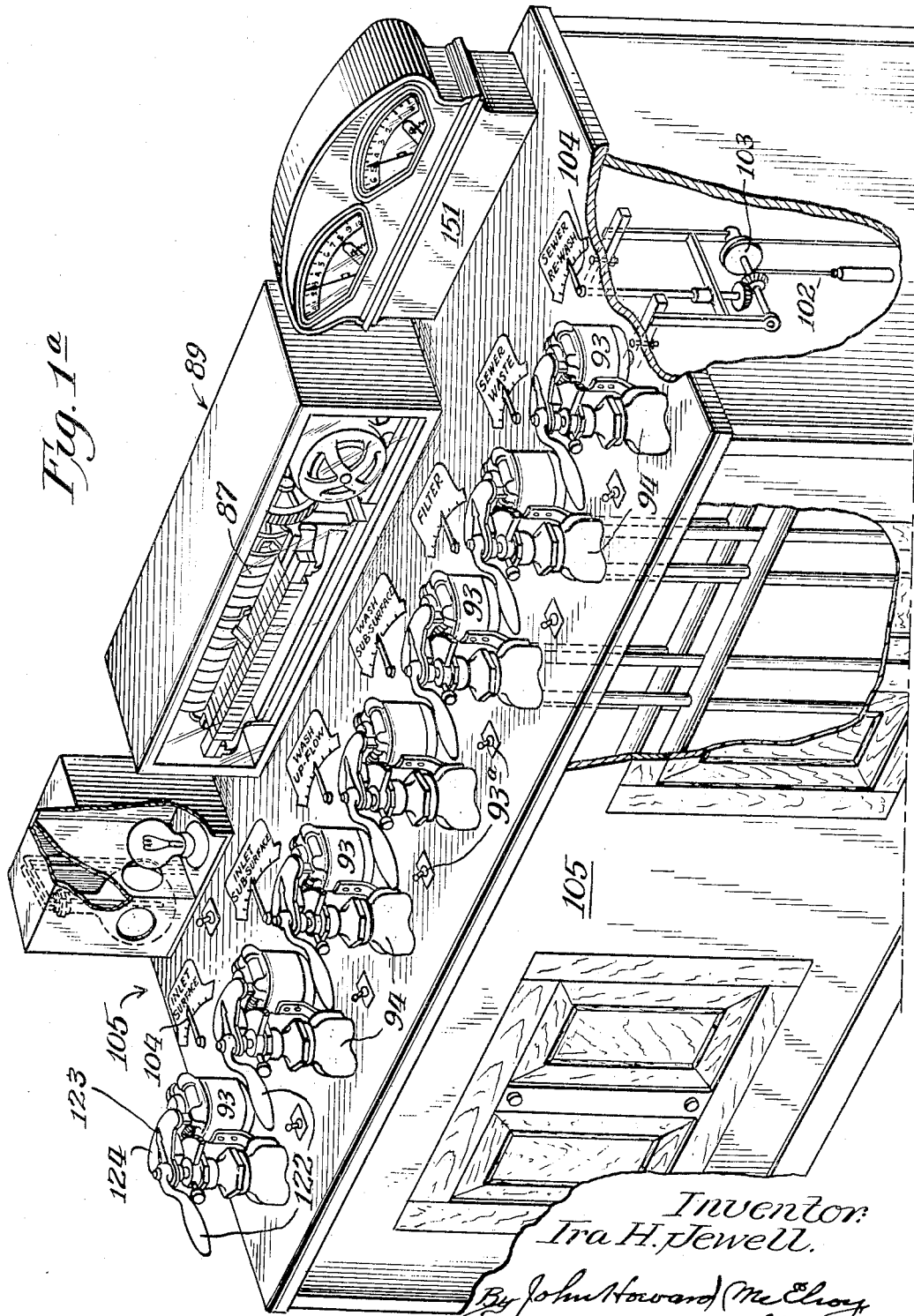

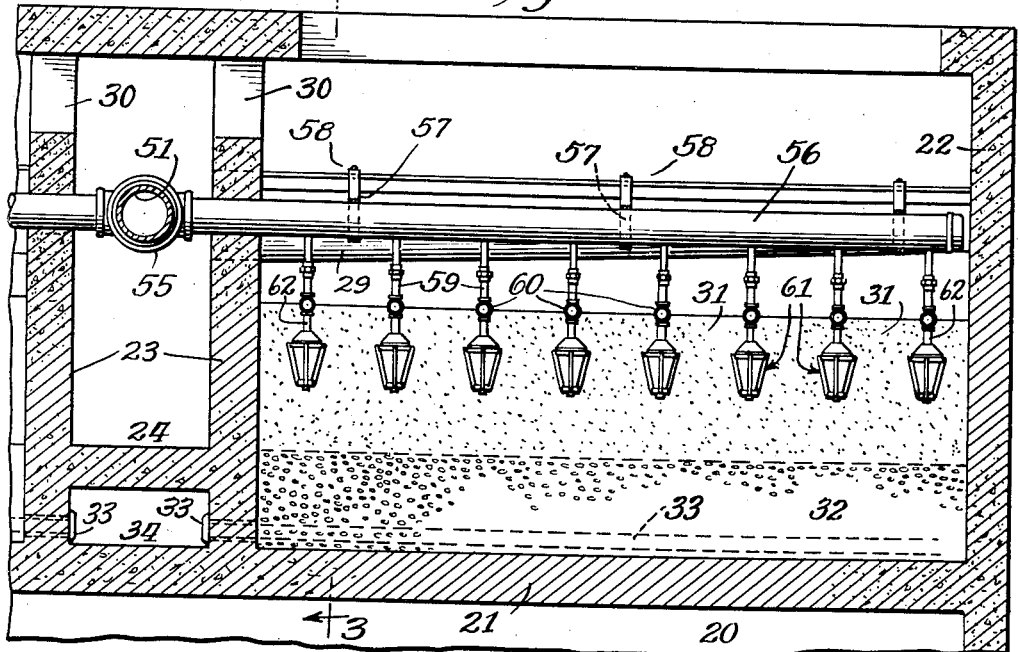
Fig.2
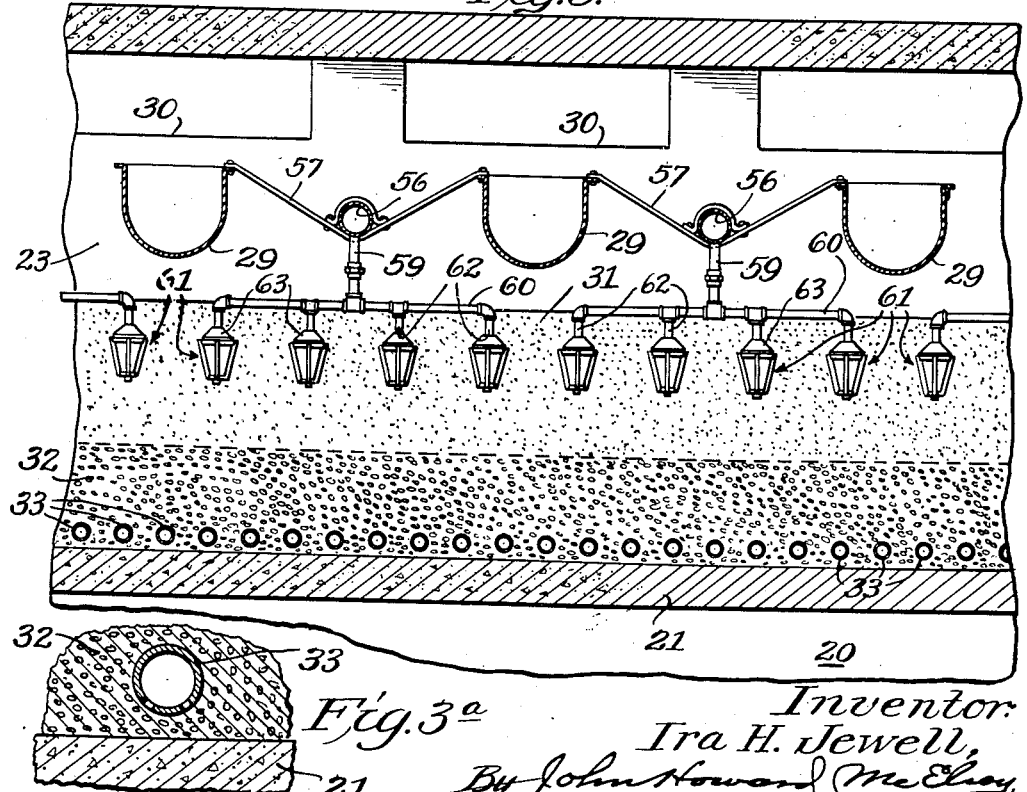
Fig.3
Fig.3a
Inventor:
Ira H. Jewell,
By John Howard McElroy
his Atty

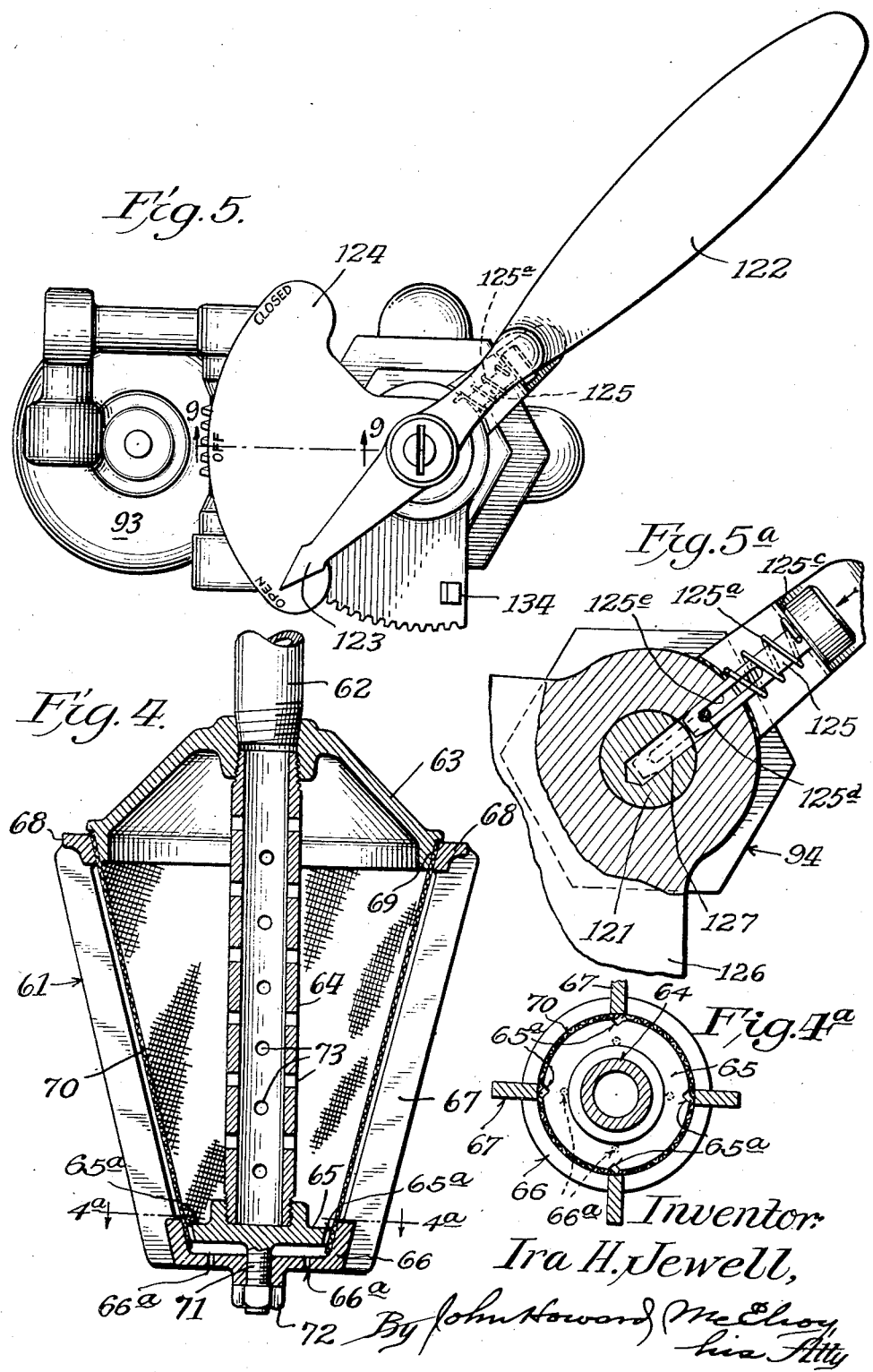

March 7, 1939.  I. H. JEWELL  2,149,680
FILTER
Filed Feb. 28, 1935   8 Sheets-Sheet 5
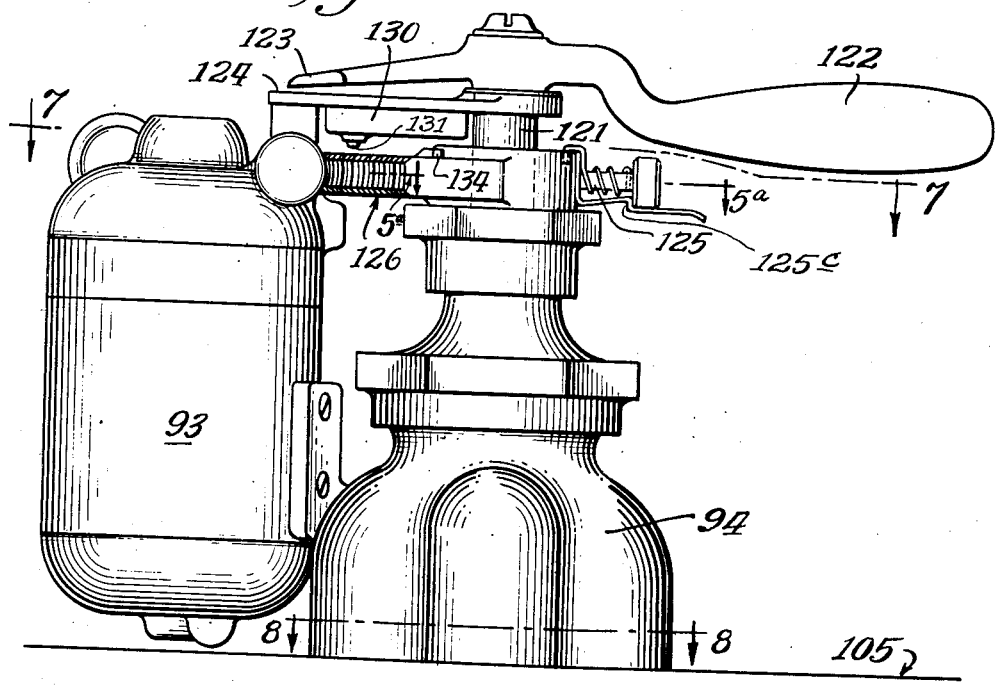
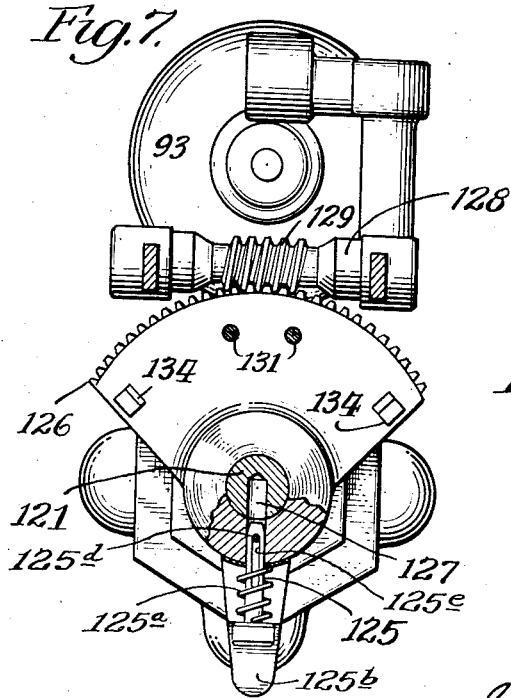
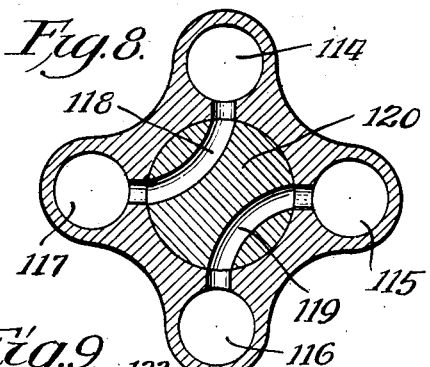
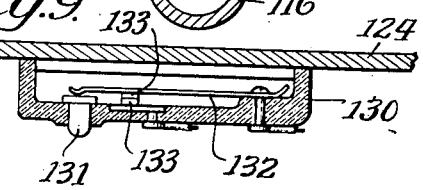
Inventor:
Ira H. Jewell,
By John Howard McElroy
his Atty

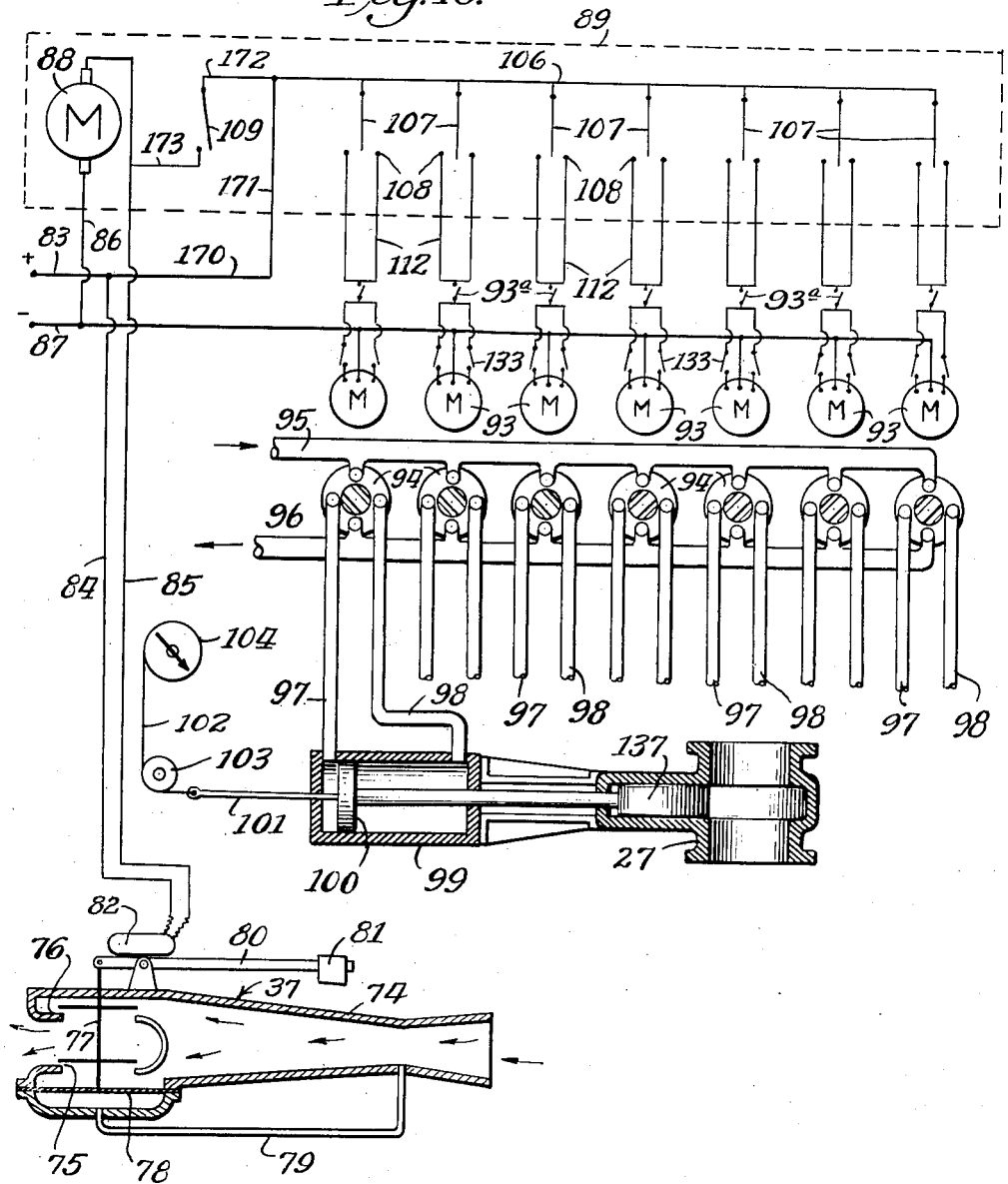

March 7, 1939.   I. H. JEWELL   2,149,680
FILTER
Filed Feb. 28, 1935   8 Sheets-Sheet 7
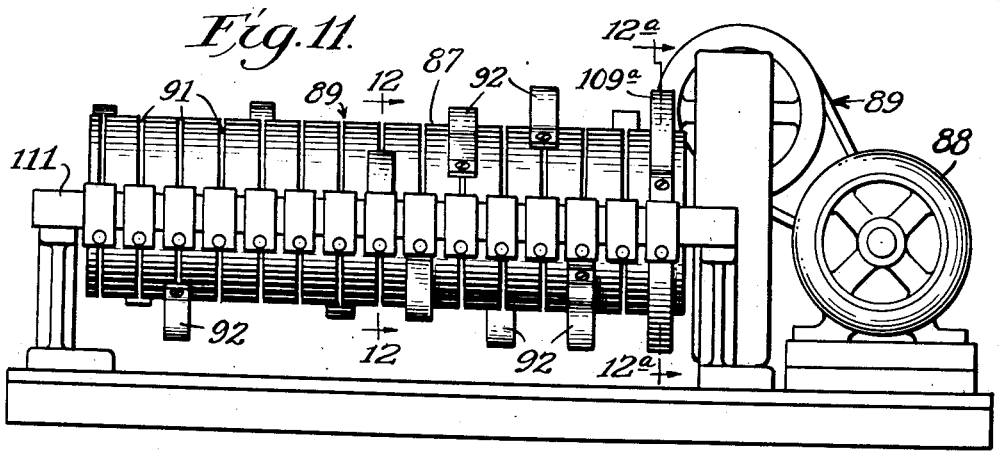
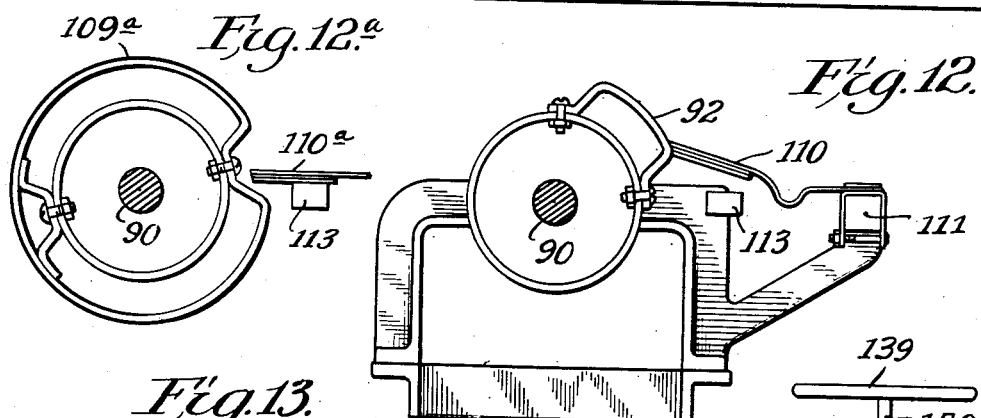
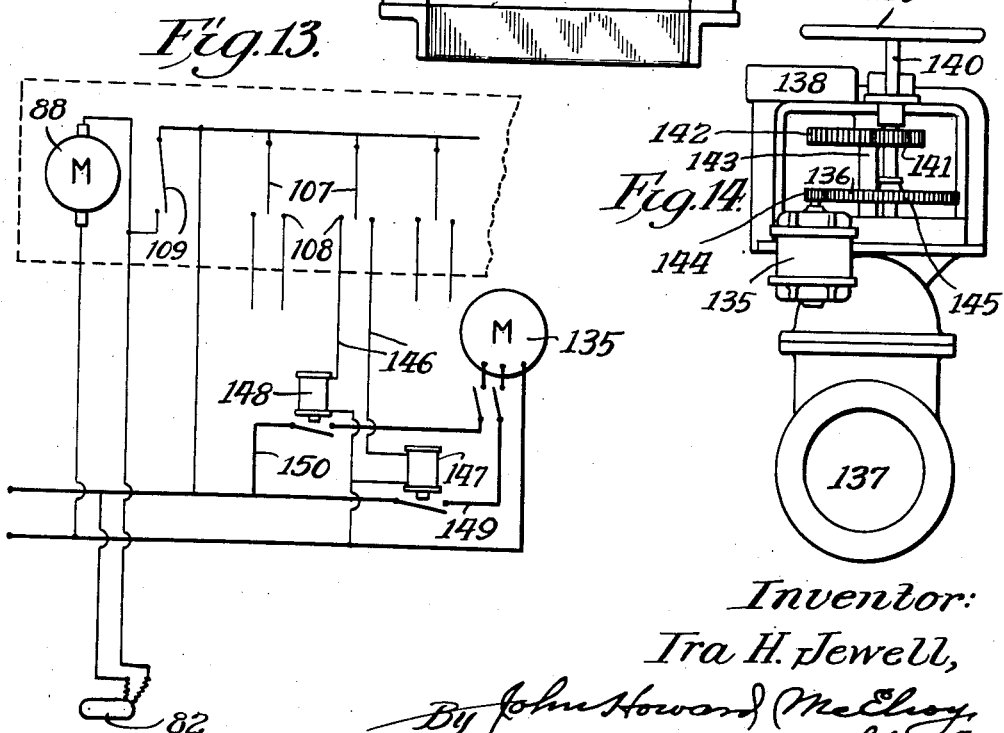
Inventor:
Ira H. Jewell,
By John Howard McElroy,
his Atty March 7, 1939.  I. H. JEWELL  2,149,680
FILTER
Filed Feb. 28, 1935  8 Sheets-Sheet 8
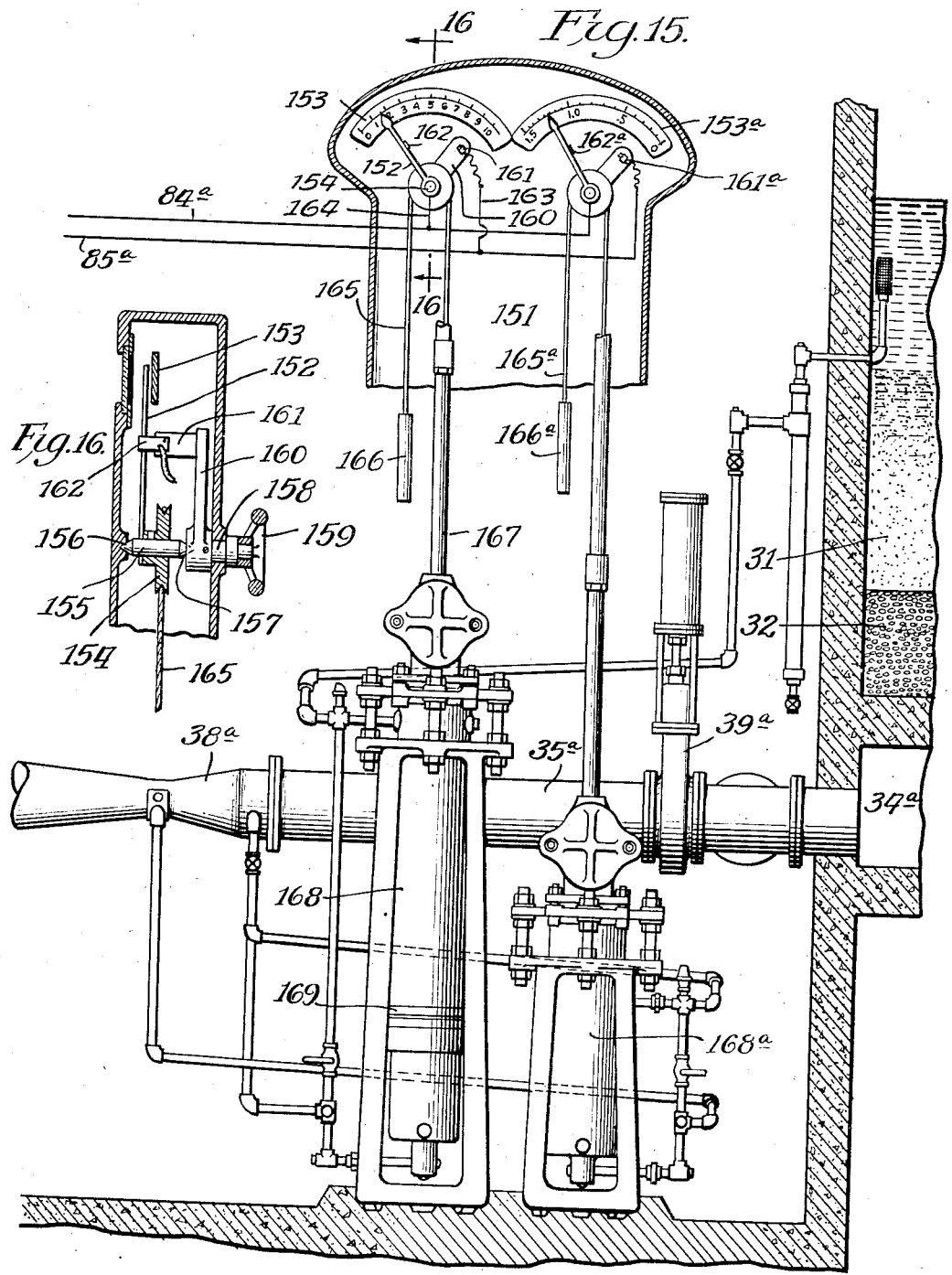
Inventor:
Ira H. Jewell,
By John Howard McElroy,
his Atty Patented Mar. 7, 1939

2,149,680

UNITED STATES PATENT OFFICE 2,149,680

FILTER

Ira H. Jewell, Evanston, Ill.

Application February 28, 1935, Serial No. 8,732

10 Claims. (Cl. 210—130)

My invention is concerned with filters, and it is designed to produce a filter, such as are ordinarily used in municipalities or wherever a large capacity is required, in which the sand is washed automatically whenever it becomes sufficiently fouled, as indicated by the action of the rate controller or the loss of head gauge, that washing is necessary for further operation at the desired rate. It is also concerned with such a filter that has hand-operated controlling means, whereby the washing can be done in the ordinary manner, if desired, without the use of the automatic action.

It is further shown as applied to my novel method of filtration and apparatus by which it can be best carried out, which can be added to filter plants already built to increase their capacity without increasing their size, or which can be included in the original installation for the same purpose, which apparatus also enables me to carry out my novel and effective method of washing the sand or other loose filtering material used.

To illustrate my invention, I annex hereto eight sheets of drawings, in which the same reference characters are used to designate identical parts in all the figures, of which—

Fig. 1 is a perspective view, somewhat diagrammatic, with many parts broken away, of a portion of a municipal filter having my invention applied thereto;

Fig. 1ª is a perspective view, on a larger scale and with parts broken away, of the operating control table;

Fig. 2 is a transverse section on the line 2—2 of Fig. 1;

Fig. 3 is a longitudinal section on the line 3—3 of Fig. 2;

Figure 1:
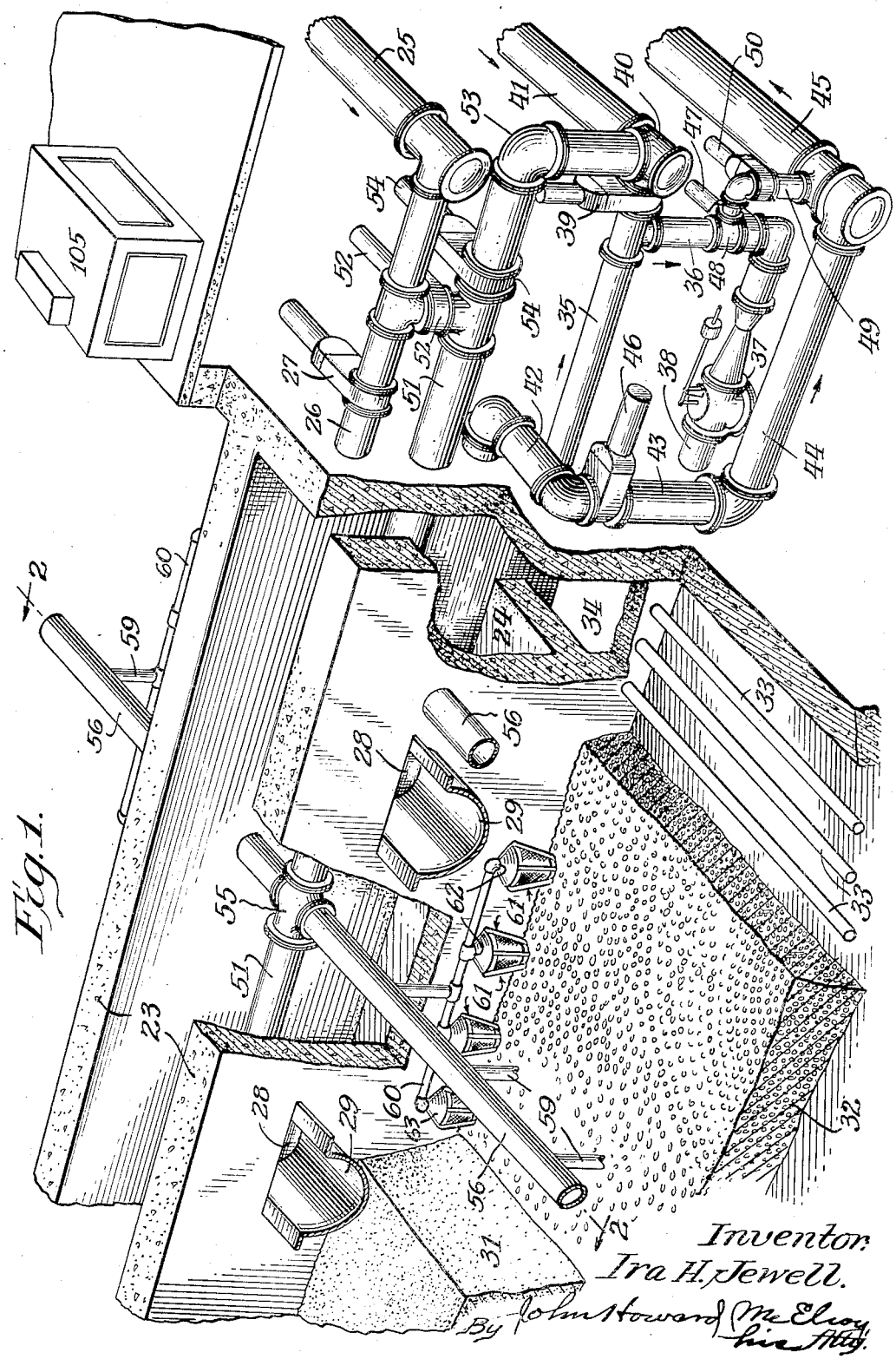

Fig. 3ª is a sectional detail, on a larger scale, of one of the perforated collecting pipes;

Fig. 4 is a vertical section, on an enlarged scale, of one of the subsurface filtration members;

Fig. 4ª is a horizontal section on the line 4ª—4ª of Fig. 4;

Fig. 5 is a top plan view of one of the pilot valves and its attached handle and electric motor secured thereto, placed on the operating table for use either in the automatic or manual washing of the filter;

Fig. 5ª is an enlarged detail, in section on the line 5ª—5ª of Fig. 6;

Fig. 6 is a view of the elements shown in Fig. 5, in side elevation;

Fig. 7 is a top plan view of the same in section on the line 7—7 of Fig. 6;

Fig. 8 is a section through the pilot valve on the line 8—8 of Fig. 6;

Fig. 9 is a detail in section on the line 9—9 of Fig. 5;

Fig. 10 is a diagrammatic view showing the electrical circuits and their relation to the pilot valves and rate controller in one adaptation of my invention;

Fig. 11 is a side elevation of the program switch which I employ in carrying out the automatic washing system;

Figs. 12 and 12ª are vertical sections, respectively, on the lines 12—12 and 12ª—12ª of Fig. 11;

Fig. 13 is a diagrammatic view showing a different construction and circuits where electric motors are employed to shift the valves, instead of the hydraulic motors shown in Fig. 10;

Fig. 14 is a view showing one of the electric motors and its connections for the system shown in Fig. 13;

Fig. 15 is a view, partly in elevation and partly in section, of a preferred form in which the automatic washing may be started either by an adjustment of the rate-of-flow indicator or of the loss of head gauge; and Fig. 16 is a detail in section, on an enlarged scale, on the line 16—16 of Fig. 15.

Referring first to Figs. 1 to 4, inclusive, I have shown therein my novel subsurface filtration means as applied to the ordinary municipal filtration plant, which means in somewhat different details are shown in my prior applications Nos. 698,852 and 702,907, filed November 20, and December 18, 1933, respectively, as I intend to use my novel automatic washing system with the more complicated, combined surface and subsurface filtration plants, as well as with simpler plants using only the surface, or subsurface, system alone.

In the broken-out, fragmentary perspective view constituting Fig. 1, as well as in Figs. 2 and 3, the customary clear well 20, indicated fragmentarily, has its roof supporting the bottom 21 of the filter units, which are preferably arranged in pairs, with the outer end walls 22, and with the adjacent end walls 23 combining to form a channel 24 into which the treated water to be filtered flows from the supply pipe 25 through the connection pipe 26, which contains the controlling valve 27, which is here shown as a valve operated by hydraulic motor, although it might be operated by an electric motor, as shown in Fig. 14. The treated water rises in the channel 24 and flows through the openings 28, in which are placed the ends of the wash troughs 29, and in normal operation fills the chambers until the water therein reaches the level of the openings 30, seen in Fig. 3. The water during the filtering operation by the surface method seeps down through the bed of loose sand 31, which rests on a permeable layer 32, which ordinarily consists of graded gravel resting on the bottom of the chamber and having the customary perforated collecting pipes 33 in its bottom, which pipes 33 open into the rectangular channel or conduit 34 directly beneath the channel 24, and from which the filtered water passes through the pipe 35 connected by the branch pipe 36 and elbows with the rate controller 37, seen in perspective in Fig. 1 and shown in vertical section in Fig. 10, which through the pipe 38 empties into the clear well 20.

With the surface filtration alone, when the filter bed is to be washed, the valve 27 is closed, shutting off the supply of treated water, and the valve 39 placed in the pipe 35 next to where it is connected by the T 40 with the wash-water pipe 41, is opened so the wash water under pressure can now flow through the pipe 35 into the channel 34, thence through the pipes 33, up through the permeable layer 32, the sand bed 31, expanding the sand bed when it has become foul, and carrying up the impurities from the bed 31, and overflowing into the troughs 29, which deliver the dirty wash water through the pipes 42, 43, 44 and 45 to the sewer. One of these pipes, as 43, has therein the hydraulic motor valve 46, which will, of course, be closed during the filtering operation and opened during the washing operation, its operation being the reverse of the valve 27. After the washing operation, it is desirable to drain off any wash water which may be left in the pipes 33 and channel 34 before resuming the filtering operation, and for this purpose I place the valve 47 in the pipe 36 below the T 48 which connects the pipe 36 with the pipe 49 leading to the sewer pipe 45, which pipe 49 contains the valve 50. For drainage the valve 47 must be closed and the valve 50 opened. When the drainage is completed, they are reversed, and when the valve 27 is then opened and the valve 46 closed, filtering will be resumed. The surface filtration system thus far described is that customarily employed at present in large municipal plants. In carrying out my novel method of subsurface filtration and also my novel method of washing the sand bed, additions now to be described may be made to the plants now in use, and in the preferred form of my invention, I carry it out as follows:

Beneath the treated-water pipe 26, I extend the pipe 51 through the length, and a suitable distance above the bottom, of the channel 24, and connect it by the hydraulic valve 52 with the pipe 26 outside of the valve 27, so that by closing the valve 27 and opening the valve 52, I can supply treated water for subsurface filtration only, or I can open the valve 27 and use both methods simultaneously. The wash-water pipe 41 is connected by the elbow 53 with the pipe 51 having the hydraulic valve 54 therein between the valve 52 and the elbow 53, so that by closing the valve 52 and opening the valve 54, wash water can be supplied to the pipe 51, and subsurface washing, as will be hereinafter explained, can be carried out at the same time as the regular up-flow washing, with the advantages to be hereinafter described.

At suitable intervals in the pipe 51, I place the connections 55 and extend transverse pipes 56, which may be supported in any suitable manner, as by the shallow V-shaped rods 57 supported from the troughs 29, which have their ends supported in the walls 22 and 23. Extending downward from the pipes 56 at suitable intervals are the smaller vertical pipes 59 which have on their lower ends the transverse pipes 60, which have depending therefrom at suitable regular intervals the subsurface filter heads or members 61, well beneath the surface of the sand bed and preferably constructed as shown in Fig. 4.

Short pipes 62 extend downwardly from the pipe 60 and have the top pieces 63 of the heads 61 screwed thereon. The head 61 preferably consists of a conical piece 63 having the perforated pipe 64 threaded into the center thereof and forming in effect a continuation of the pipe 62. Threaded on and closing the bottom of the pipe 64 is the clamping disk 65 having a beveled edge co-operating with an inner bevel formed on the circular bottom 66 of the frame 67, which has the ring 68 at its upper end connected by a plurality of ribs with the bottom 66. The top 63 has the beveled clamping edge 69 co-operating with the complementary internal edge of the ring 68 to clamp between them the top of the truncated conical screen member 70, the bottom of which is clamped between the edges of the member 65 and the bottom piece 66, as will be readily apparent. The recesses 65$^a$ in the edge of the clamping disk 65, and the aperture 66$^a$ in the bottom 66 of the frame 67 form outlets through which any diatoms or fine sand which might otherwise accumulate in the bottom of the head will be washed out. The threaded extension 71 of the member 65 passing through a central aperture in the bottom 66 and drawn down by the nut 72 serves to clamp the bottom of the screen member 70 firmly in place, and when the top piece 63 is screwed tightly on the pipe 64, its upper end is similarly tightly clasped. This screen is preferably in the form of a fine-mesh wire, preferably of a rectangular mesh, and adapted to prevent the entry of the filter sand, which is usually of a .5 millimetre size, while permitting the free outward flow therethrough of the water. The apertures 73, especially in the washing action, when the pressure is considerable, cause the water to be thrown in steady streams against the interior of the screen, and passing through it forms radial currents, as it were, of the wash water, which meets similar currents from the surrounding heads. When this subsurface washing is practiced simultaneously with the customary washing, a very superior result is produced. The wash water from the pipes 33 is allowed to rise at a considerable less velocity than is necessary when the subsurface apparatus is not used, but sufficiently so that the sand in the area served by the heads 61 is expanded, i. e., lifted by the rising wash water sufficiently so that it is fluid, as it were, and can be thrown laterally by the currents of wash water from the heads 61 so that the grains of sand are ground against each other, as it were, by the conflicting currents, and any coagulant or other impurities that tend to adhere to the grains of sand are scoured off, and all danger of the formation of "mud balls" (so-called, and which are found in filters washed by the ordinary method) is eliminated.

In the filtering action, the treated water passes out through the screen surfaces at probably about the same velocity as it descends by gravity in ordinary filtration, and is filtered by the surrounding sand, which is below that fouled by the ordinary surface filtration, so that a greatly increased portion of the sand bed is actually effectively used in the process of filtration, as the normal filtration surface of the sand bed is increased by an area at least equal to the surface of all the screens embedded therein, and as a result the capacity of the filter is actually increased, and I have found that its capacity, without increasing the size of the sand bed, may be easily doubled, or even more.

The practice in operating municipal filters is to run them so long as they operate efficiently, but the time comes when the surface of the sand bed becomes so clogged with the coagulant and impurities that the water passes through it too slowly for the filter to be efficient. In practice, this condition is shown by the loss of head gauge, and it is also apparent in the action of the automatic rate controller 37, which is set to deliver a certain amount of filtered water to the clear well for each minute of operation so long as there is no substantial loss of head due to the fouling of the sand bed. In carrying out my automatic washing action, I may start it either by the falling off apparent in the rate controller 37, or by the action of the loss of head gauge. I will first describe the rate controller method, referring first to Fig. 10.

The rate controller 37, which is shown somewhat diagrammatically and which per se forms no part of my invention and is of a well known type on the market, consists of a casing 74, preferably of the shape shown, in which a pair of valve seats 75 and 76 form the outlet, and a double-disk balanced valve 77 co-operates with the seats, the lower end of the stem being secured to the diaphragm 78, which tends to close the valve. The upper end of the stem of the valve 77 is pivoted to a lever 80 fulcrumed on the casing, as shown, and provided with the weight 81, which can be adjusted thereon and secured in any desired position to control the rate of flow through the casing, and thus the rate of filtration. It will be obvious that the farther the valve disks are raised above the seats 75 and 76, the faster the flow, and their position will be controlled by that of the weight 81.

Fastened on the lever 80 above the fulcrum point is the mercury switch 82, which has therein two contacts in one end and not normally engaged by the small amount of mercury therein when the valve is held in the position for which it is set by the filtered water passing it. When the pressure of the water passing the valve and tending to hold it open falls, due to the fouling of the sand above the allowed amount, the downward pressure on the diaphragm 78 is reduced and the weight 81 pulls the valve stem up and tilts the lever until the mercury flows to the end containing the contacts and closes the circuit 83, 84, 85, 86 and 87 through the motor 88 of the program switch 89, shown in Figs. 11 and 12, and with its circuits and contacts indicated diagrammatically in Fig. 10. Reducing gearing from the armature shaft of the motor 88 to the shaft 90 journaled in the framework of the program switch serves to rotate the cylindrical body of the latter slowly, which body has the fifteen (in the present instance) annular slots 91 therein necessary to position the fourteen contacts 92 necessary to open and close and reverse the current through the seven motors 93 which automatically operate the seven four-port valves 94 (shown diagrammatically in Fig. 10), each of which is connected to the pressure supply pipe 95 and to the drain pipe 96, and to the pipes 97 and 98 leading to the ends of the cylinder 99 of whichever of the seven hydraulic valves 27, 39, 46, 47, 50, 52 and 54 it controls. The piston 100 of each hydraulic valve preferably has a rod 101 extending through a packing in one end of the cylinder 99, and has a cord or wire 102 led around a suitable pulley or pulleys 103 suitably connected to an indicator 104 located on the operating control table 105 shown diagrammatically in Fig. 1, without the seven indicators 104 and without any of the four-way valves 94 which are located thereon. These indicators are desirable in case it is desired to interfere with the automatic operation and operate the valves by hand, as they show the position of each of the seven valves.

The cylindrical body of the program switch 87 furnishes the conductor 106 and the seven contacts 107 indicated in Fig. 10, and fourteen of the contacts 92 furnish the co-operating contacts 108 of the diagram. During the part of the cycle while the switches are being shifted to move the valves from the filtering to the washing position, the circuits through the motors 93 are closed to rotate them in one direction, while during the part in which the valves are moved back to the filtering position, the circuits are closed to cause them to reverse them, as will be obvious.

Referring to Figs. 11 and 12, the contacts 108 of the diagram are the contact members 92, which co-operate with the spring contacts 110 fastened on the insulating bar 111 extending the length of the cylinder, and the connecting wires 112 (not shown in Figs. 11 and 12) leading to the motors 93 are secured thereto. The spring contacts 110, when the circuit is broken, rest on the insulating abutments 113 carried by the framework to receive them.

Referring now to Figs. 5 to 9, the valves 94, connected as described to the pipes 95, 96, 97 and 98, indicated diagrammatically on Fig. 10, and partly exposed in Fig. 1ª, are secured on the top of the operator's control table 105, and the aforesaid pipes extend up through the table and are threaded into the apertures 114, 115, 116 and 117, which have the ports shown to connect them with the four-way passages 118 and 119 in the valve plug 120 mounted to rotate in the valve casing, and having the stem 121 projecting up through the top of the casing, and having the handle 122 secured thereto and carrying the pointer 123 to co-operate with the dial 124 carried by the motor casing. The dials will carry the names of the valves they control, and it will be obvious that by the manipulation of the handles 122 the valves 27, 39, 46, 47, 50, 52 and 54 can be set as needed for washing when the loss of head gauge, adjacent or on the table 105, shows that it is necessary.

For the preferred automatic operation, however, the pins 125 (see Fig. 7) mounted to slide radially in the hubs of the quadrants 126 will be slid into the apertures 127 in the valve stems 121 so that the valves will be swung back and forth by the motors 93 through a train of gearing (shown encased), and which will ordinarily consist of a worm on the armature shaft engaging a worm gear on a horizontal shaft having a worm on its other end engaging a worm gear on one end of a transverse shaft, the other end of which carries a worm engaging a worm gear on the shaft 128 which has the worm 129 engaging the teeth on the segment 126, all as will be readily understood. This suffices to turn the shaft 121 through ninety degrees, as is necessary to shift the valve body 120 from an operative position to the off position, and then on to the reverse. To stop the motor 93 when the valve is closed, I provide a switch in the casing 130 on the under side of the dial 124, and seen in vertical section in Fig. 9. A pair of insulation plugs 131 with rounded bottoms slide vertically in the bottom of the casing 130, each being held down by a leaf spring 132 carrying one of the two contacts 133, which, as seen in the diagrammatic Fig. 10, form the means of starting, stopping and reversing the motors 93. Each of the quadrants 126 carries at its ends a pair of lugs 134, which when the shaft 12 and its attached quadrant reaches the limit of its movement in either direction engages the rounded bottom of the co-operating plug 131 and lifts it to break the circuit of the motor 93, and leave the valve in its position to allow water from the pipe 95 to flow through the passage 118 or 119, as the case may be, and cause the piston 100 to traverse the length of the cylinder 99, and thus open or close the associated valve, which remains in this position until the proper contact 92 serves to close the circuit in the opposite direction through its associated motor 93, when the movement of the quadrant will be reversed until the other projection 134 breaks the circuit, leaving the valve body 120 in the shifted position in which the water can flow from the pipe 95 through the other of the passages 118 or 199 to reverse the movement of the piston 100. By setting the contacts 92 properly for all seven (or fewer if the sub-surface filtration system is not used) of the valves 27, 39, 46, 47, 50, 52 and 54, it will be obvious that the valves can be operated automatically for washing when the circuit through the motor 88 is once closed by the action of the rate controller 37 closing the mercury switch 82.

In Figs. 13 and 14, I have illustrated an alternative arrangement in which I dispense with the motors 93 and the four-way valves 94 on the operator's table and substitute electric motors 135, which operate through suitable reducing and direction changing gearing 136 to move the valves 137 to opening position, and to close it by reversing the motor. Limit switch mechanism 138 similar to that shown in Figs. 6, 7 and 9, will serve to stop the motor 135 when the valve is completely closed or opened, as the case may be, and the hand wheel 139 on the vertical shaft has a pinion 141 gearing with the wheel 142 on a shaft 143 which will have a screw connection (not shown) with the valve 137 so that as the shaft is rotated the valve will be raised or lowered as the case may be. The armature shaft of the motor 135 carries a pinion 144 meshing with a large gear 145 secured on the shaft 140 so that the valve 137 can be operated either by the hand wheel 139 or the motor 135. As the motors 135 are larger and can carry more current than the motors 93 of the hydraulic valve system, it is not advisable to connect their circuits directly with the program switch, but the latter merely operates circuits 146, which include the magnets 147 and 148 which open and close the switches in the heavy duty circuits 149 and 150 to the motors 135.

Referring now to Figs. 15 and 16, I show a preferred form in which the starting of the automatic washing action may be brought about either by the rate-of-flow controller or by the loss of head gauge. The general layout of the filter may be as before, but, for simplification, I have illustrated the conventional type of municipal filter, with the pipe 35ᵃ leading from the channel 34ᵃ, and carrying the filtered water through the rate-of-flow controller 38ᵃ, and thence to the clear well. The filter is shown as equipped with the "Simplex" double indicating gauge for the loss of head and rate of flow, but without showing all of the floor stand 151 on which such gauges are usually located, some of the mechanism and connections being broken away. The pointer 152 for the loss of head dial 153 is secured on the hub of the wheel 154 secured on the shaft 155 journaled in the bearings 156 and 157 located, respectively, in the casing 151 and in the end of the short shaft 158 journaled in the rear of the casing and having the hand wheel 159 by which the position of the arm 160 carying the contact 161 may be adjusted in any desired position to determine just how far the loss of head shall go before the filter is automatically washed. The pointer 152 carries a co-operating contact 162, and it will be understood that the contacts are connected by the conductors 163 and 164 with the wires 84ᵃ and 85ᵃ corresponding to the wires 84 and 85 of the circuit for the motor 88 shown in Fig. 10. The wheel 154 has the cord or wire 165 pinned to it, which cord or wire has the counterweight 166 secured to one end, while the other end extends downward through the protective pipe 167 to the loss-of-head cylinder 168, which is connected to a position 169 which lowers with the loss of head, its movement being controlled by mechanism and piping connected with the pipe 35ᵃ and the filter, which mechanism and pipes form no part of my invention, and which need not be here further described.

The rate-of-flow dial 153ᵃ has the same kind of a pointer 152ᵃ, adjustable arm 160ᵃ, contacts 161ᵃ and 162ᵃ, conductors 163ᵃ and 164ᵃ, etc., as the loss of head gauge, but the cord 165ᵃ extends to the rate-of-flow cylinder 168ᵃ connected to the controller 38ᵃ, so that as the rate of flow falls, the contact 162ᵃ is moved toward the contact 161ᵃ to whatever position it may be adjusted. It will be understood that I may use either of the sets of contacts or both, so that the washing will be started as soon as needed, whether first indicated by the loss of head or the rate of flow.

The mode of operation of my automatic washing mechanism will now be readily apparent. The time that it takes for the motor 88, through the reducing gearing, to rotate the program switch 89 through three hundred and sixty degrees will be enough to move all of the valves 27, 39, 46, 47, 50, 52 and 54 by the action of the motors 93 from the position they occupy during filtration to the washing and draining position, allow for the washing, and move the valves back again to the filtering positions, the contacts 92, of course, being of the proper sizes and properly adjusted on the switch to effect their movements in the proper time and sequence. When this reversal has been completed, the valves 27, 52 and 47 are in their open position, and all of the others are closed. If the switch 82 (or 161 and 162, or 161ᵃ and 162ᵃ of Fig. 15) were always closed at exactly the same time after the filtration is resumed, the switch 109 and the contact 109ᵃ, seen in Figs. 11 and 12ᵃ, would not be necessary. But as this time may vary, I utilize this contact 109ᵃ, which keeps a circuit closed through the motor by the contacts 170, 171, 172 and 173, even if the switches 82, 161, etc., are open, so that the motor 88 will always stop with the program switch 89 at the same place, no matter how much the time of opening the switches 82, 161, etc., may vary, as the motors do not stop after they open until the contact 110ᵃ drops off of the end of the contact 109ᵃ. It will be understood that the time necessary to give the program switch a complete rotation through three hundred and sixty degrees is long enough to complete the movement of the valves back to filtering position and to allow the loss of head gauge and the rate-controller indicator to move back to normal position and break the circuit through the conductors 84 and 85, no matter how much variation there may be in the time it takes for these to reach their normal positions after the valves have all been moved back to their filtering position.

Referring to the pins 125, shown in Figs. 5 to 7, inclusive, the position of which determines whether the filter is to be washed automatically or by hand manipulation, as shown in said figures, I preferably secure the contractile spring 125a surrounding it at its outer end to the pin and at its inner end to the hub of the quadrant 126, as best seen in Fig. 6. To hold it withdrawn, as in manual operation, I secure to the quadrant the leaf spring 125b having the shoulder 125c which engages the head of the pin 125 when it is contracted and holds it out of the aperture 127 against the tendency of the contractile spring 125a to pull it back in. A small vertical pin 125d secured in the hub of the quadrant 126 and passing through the slot 125e in the pin 125, as seen in Fig. 7, prevents the possibility of its becoming misplaced.

It will be understood that the contacts 92 will be set in the slots 91 so as to use the surface and subsurface filtration simultaneously. If it is desired for any reason to use either alone, I have placed on the operating table a switch 93a, preferably for each of the motors 93, and indicated diagrammatically in Fig. 10, so that any desired one of the valves 27, 39, 46, 47, 50, 52 and 54 can be cut out of the automatic operation without the necessity of removing its particular contact 92 from the program switch. The contacts for the valves controlling the regular and the subsurface washings are set to operate simultaneously, but if for any reason either is to be operated separately, proper manipulation of the switches 93a will enable this result to be obtained.

While I have herein shown and described a novel motor-operated pilot-valve, as a part of my novel automatically washed filter, I do not herein claim the same, per se or specifically, as it is reserved for a divisional application.

While I have herein shown and described my invention as embodied in the form which I at present consider best adapted to carry out its purposes, it will be understood that it is capable of modification, and that I do not desire to be limited in the interpretation of the following claims except as may be necessitated by the state of the prior art.

What I claim as new, and desire to secure by Letters Patent of the United States, is:

1. In a filtration plant, the combination with a bed of filtering material open at its surface to atmospheric pressure at all times provided with means for retaining it only at its sides and bottom and inlet and effluent means, said inlet means including subsurface members in the bed, conduits and valves connected with said sub-surface members by which either water to be filtered or wash water can pass through said subsurface members into the bed, means to prevent a reverse flow back through them, and conduits and valves for said effluent means whereby the filtered water can be drawn off for use, or the wash water can flow up through and out of the bed to the waste, of motors operatively connected to said valves, automatic means for starting, stopping and reversing said motors, and means controlled by the rate of filtration for starting said automatic means so that when the rate of filtration falls below a desired point, the motors, and means controlled by the rate of filtration for starting said automatic means, will operate to open and close the necessary valves so that the bed will be washed.

2. A filtration plant as described in claim 1 having means for throwing the subsurface or the surface filtration valves out of operation during the cycle of operation by said automatic means.

3. In a filtration plant, the combination with a bed of loose filtering material provided with means for retaining it only at its sides and bottom and inlet and effluent means whereby water can be passed downward through the bed to filter it and wash water can be passed upward through it to wash it, of a series of valves connected with the inlet and effluent means to control said filtering and washing movements of water through the bed, motors for operating said valves, a motor operated program switching mechanism set to start the motors necessary to close some of the valves and open others to shift them from their filtering to their washing positions and after a suitable time to reverse their movement to shift the valves from the washing to the filtering position and then break the circuit to its own motor, a switch to start the program switching mechanism, and means actuated by the rate of filtration to close said switch when said rate falls to a certain point.

4. A filtration plant as described in claim 3 which has a rate of flow controller, including a valve machism, and connections from said valve mechanism to the program switching mechanism switch to close the latter when the rate of filtration falls below the desired limit.

5. A filtration plant as described in claim 3 which is provided with means operable independently of the program switching mechanism for starting and stopping and reversing the motors for operating the valves of the series.

6. In a filtration plant, the combination with a bed of loose filtering material open at its surface to atmospheric pressure at all times provided with means for retaining it only at its sides and bottom, and inlet and effluent means whereby water can be passed downward through the bed to filter it and wash water can be passed upward through it to wash it, of a series of valves connected with the inlet and effluent means to control said filtering and washing movement of water through the bed, electric motors for controlling the operation of said valves, automatic means for starting, stopping, and reversing said motors, and means controlled by the rate of filtration so that when it falls below a desired point said automatic means will cause the motors to operate to open and close the necessary valves so that the bed will be washed.

7. In a filter, the combination with a tank open to the atmosphere at its top containing a filter bed, of inlet and effluent means for water to be filtered and wash water, motor operated valves constituting a part of said inlet and effluent means controlling the operation of filtration and of washing the bed, automatic means for operating the valves through a cycle from filtering to washing and back to filtering, said automatic means including mechanisms whereby it ceases to function when the valves reach filtering position during the cycle, starting means controlled by the rate of filtration for setting said automatic means in operation when the rate drops below a predetermined limit, and means for disconnecting each of said valves from the automatic means to interrupt said cycle when desired.

8. In a filter, the combination with a tank open to the atmosphere at its top containing a filter bed, of inlet and effluent means for water to be filtered and wash water, motor operated valves constituting a part of said inlet and effluent means controlling the operation of filtration and of washing the bed, automatic means for operating the valves through a cycle from filtering to washing and back to filtering, said automatic means including mechanism whereby it ceases to function when the valves reach filtering position during the cycle, and starting means controlled by the rate of filtration for setting said automatic means in operation when the rate drops below a predetermined limit, said automatic means consisting of a program switch, a motor driving said switch, an electric motor controlling the movement of each of the valves, and circuits from the program switch to each of the electric motors and opened and closed thereby.

9. A filter as described in claim 8, in which the valves are operated directly by hydraulic motors, and the electric motors serve to operate pilot valves that control the water supply to the hydraulic motor.

10. A filter as described in claim 8 having an electric motor for each of the valves, and reducing gearing to the valves driven by the motor.

IRA H. JEWELL.